US012776509B2

(12) United States Patent
Li

(10) Patent No.: US 12,776,509 B2

(45) Date of Patent: Oct. 27, 2026

(54) ELECTROCHEMICAL DEVICE AND ELECTRONIC DEVICE

(71) Applicant: Ningde Amperex Technology Limited, Ningde (CN)

(72) Inventor: Xuecheng Li, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 826 days.

(21) Appl. No.: 18/192,918

(22) Filed: Mar. 30, 2023

(65) Prior Publication Data

US 2023/0238565 A1 Jul. 27, 2023

Related U.S. Application Data

(63) Continuation of application No. PCT/CN2022/109491, filed on Aug. 1, 2022.

(30) Foreign Application Priority Data

Aug. 27, 2021 (CN) ......................... 202110996211.5

(51) Int. Cl.
*H01M 10/04* (2006.01)
*H01M 10/42* (2006.01)

(52) U.S. Cl.
CPC ... *H01M 10/0431* (2013.01); *H01M 10/4235* (2013.01); *H01M 2220/30* (2013.01)

(58) Field of Classification Search
CPC ......... H01M 10/0431; H01M 10/4235; H01M 2220/30
USPC .......................................................... 429/163
See application file for complete search history.

(56) References Cited

FOREIGN PATENT DOCUMENTS

| | | | |
|---|---|---|---|
| CN | 200986932 | Y | 12/2007 |
| CN | 106797055 | A | 5/2017 |
| CN | 208173683 | U | 11/2018 |
| CN | 110071320 | A | 7/2019 |
| CN | 211455865 | U | 9/2020 |
| CN | 112768784 | A | 5/2021 |
| CN | 113097430 | A | 7/2021 |

(Continued)

OTHER PUBLICATIONS

International Search Report issued on Oct. 21, 2022 in corresponding application No. PCT/CN2022/109491; 7 pgs.

(Continued)

*Primary Examiner* — Allison Bourke
*Assistant Examiner* — Robert Gene West
(74) *Attorney, Agent, or Firm* — Maier & Maier, PLLC

(57) ABSTRACT

An electrochemical device including an electrode assembly including a first section, a first bend section, a second section, and a second bend section connected in sequence along a winding direction. A first bonding piece includes a first body portion disposed on the first bend section and a first extension portion disposed on the first section. The first body portion is configured to bond the first bend section to the housing. A second bonding piece includes a second body portion disposed on the second bend section and a second extension portion disposed on the first section. The second body portion is configured to bond the second bend section to the housing. A third bonding piece is disposed between the electrode assembly and the housing. The third bonding piece is bonded to the housing, the first extension portion, and the second extension portion.

20 Claims, 7 Drawing Sheets

(56) References Cited

FOREIGN PATENT DOCUMENTS

| | | | | | |
|---|---|---|---|---|---|
| CN | 113097571 A | * | 7/2021 | .......... | H01M 10/052 |
| CN | 113097572 A | | 7/2021 | | |
| CN | 113782805 A | | 12/2021 | | |
| JP | 3162607 U | | 9/2010 | | |
| KR | 20150099649 A | | 9/2015 | | |
| KR | 20210046337 A | | 4/2021 | | |
| WO | 2022170531 A1 | | 8/2022 | | |

OTHER PUBLICATIONS

Chinese Office Action issued on Jun. 15, 2022 in corresponding application No. 202110996211.5; 17 pgs.

* cited by examiner

ELECTROCHEMICAL DEVICE AND ELECTRONIC DEVICE

CROSS-REFERENCE TO RELATED APPLICATIONS

This application is a continuation application of International Patent Application Serial Number PCT/CN2022/109491, filed on Aug. 1, 2022, which claims priority to Chinese Patent Application Serial Number 202110996211.5, filed on Aug. 27, 2021, the contents of which are incorporated herein by reference in their entireties.

TECHNICAL FIELD

Embodiments of this application relate to the technical field of energy storage.

BACKGROUND

An electrochemical device is a device that converts external energy into electrical energy and stores the electrical energy internally so that the electrical energy can be supplied to an external electronic device (such as a portable electronic device) when necessary. Currently, electrochemical devices are widely used in electronic devices such as a notebook computer, an e-book player, a portable phone, a portable fax machine, a video recorder, an LCD television set, a portable cleaner, a backup power supply, an automobile, a motorcycle, a bicycle, a lighting device, a game console, a watch or clock, a large household battery, and a capacitor. Safety performance of the electrochemical devices is of concern to users.

In a process of implementing this application, the applicant hereof finds that during the transportation or use of an electronic device, mechanical abuse such as drop, collision, and vibration often occurs, so that a housing of the electrochemical device is prone to be stressed. The stress transmitted into the electrochemical device causes partial tearing of the interior of the electrochemical device, resulting in failure of the electrochemical device.

SUMMARY

In view of the foregoing problems, embodiments of this application provide an electrochemical device and an electronic device to overcome or at least partly solve the foregoing problem of failure of the electrochemical device.

According to an aspect of embodiments of this application, an electrochemical device is provided. The electrochemical device includes an electrode assembly, a housing, a first bonding piece, a second bonding piece, and a third bonding piece. The electrode assembly includes a first electrode plate, a second electrode plate, and a separator disposed between the first electrode plate and the second electrode plate. The first electrode plate, the separator, and the second electrode plate are wound to form a wound structure. Along a winding direction, the electrode assembly includes a first section, a first bend section, a second section, and a second bend section that are connected in sequence. The housing is configured to accommodate the electrode assembly. The first bonding piece includes a first body portion disposed on a surface of the first bend section and a first extension portion disposed on a surface of the first section. The first body portion is configured to bond the first bend section to the housing. The second bonding piece includes a second body portion disposed on a surface of the second bend section and a second extension portion disposed on the surface of the first section. The second body portion is configured to bond the second bend section to the housing. The third bonding piece is disposed between the electrode assembly and the housing. The third bonding piece is bonded to the housing, the first extension portion, and the second extension portion.

The housing is bonded to the electrode assembly by the first bonding piece and the second bonding piece, thereby reducing the wobbling of the electrode assembly in the housing, and improving the anti-drop performance of the electrochemical device. The housing is bonded to the third bonding piece, and the third bonding piece is further bonded to the first extension portion of the first bonding piece and bonded to the second extension portion of the second bonding piece, thereby reducing the wobbling of the electrode assembly in the housing, and improving the anti-drop performance of the electrochemical device. When the housing is stressed, on the one hand, the stress is cushioned by the first bonding piece, the second bonding piece, and the third bonding piece, thereby reducing the risk of tearing and damaging the electrode assembly, and reducing the risk of failure of the electrochemical device. On the other hand, the stress on the housing is transmitted to the first bonding piece and the second bonding piece through the third bonding piece, thereby reducing the risk of tearing the electrode assembly by an excessive stress between the third bonding piece and the housing. In addition, an electrolyte solution may reduce the bonding force of the third bonding piece infiltrated by the electrolyte solution, and impact the third bonding piece when the electrode assembly is dropping. The impact may further reduce the bonding force of the third bonding piece. The arrangement of the first bonding piece and the second bonding piece may reduce the risk of the wobbling the electrode assembly in the housing, and improve the safety performance.

In some embodiments, the first section and the second section are flat straight sections that are parallel to each other. In some embodiments, the first section and/or the second section are bend sections. In some embodiments, a direction from the first section to the second section is a thickness direction of the electrode assembly. In some embodiments, a direction from the first bend section to the second bend section is a width direction of the electrode assembly.

In some embodiments, the first electrode plate and the second electrode plate are of opposite polarities. The first electrode plate is a positive electrode plate, and the second electrode plate is a negative electrode plate; or the first electrode plate is a negative electrode plate, and the second electrode plate is a positive electrode plate.

In some embodiments, the housing is a packaging bag formed by a packaging film configured to package the electrode assembly. For example, the packaging film is an aluminum plastic film. In this case, the electrochemical device forms a pouch-type battery. In some embodiments, the housing is a steel shell or an aluminum shell. In this case, the electrochemical device forms a hard-case battery, such as a steel-case battery or an aluminum-case battery.

In some embodiments, the first bonding piece, the second bonding piece, and the third bonding piece are an integrated structure. That is, the first bonding piece, the second bonding piece, and the third bonding piece are a one-piece structure.

In some embodiments, the first bonding piece includes a first bonding layer, a first substrate layer, and a second bonding layer that are stacked in sequence. The first bonding layer is provided on the first body portion and is configured to bond a surface of the first substrate layer oriented away from the electrode assembly to the housing. The second bonding layer is provided on the first body portion and is configured to bond a surface of the first substrate layer oriented toward the electrode assembly to the first bend section. In this way, the first bonding piece implements connection between the first bend section and the housing, thereby reducing the wobbling of the electrode assembly in the housing.

In some embodiments, the first bonding layer is further provided on the first extension portion and is configured to bond the surface of the first substrate layer oriented away from the electrode assembly to a surface of the third bonding piece oriented toward the electrode assembly.

In some embodiments, the second bonding layer is further provided on the first extension portion and is configured to bond the first substrate layer to the electrode assembly.

In some embodiments, the surface of the first substrate layer oriented toward the electrode assembly is in contact with the first section. That is, the first substrate layer is located in the first body portion and extends from the first body portion to the first extension portion, thereby making it convenient for the first bonding piece and the third bonding piece to bond.

In some embodiments, the second bonding piece includes a third bonding layer, a second substrate layer, and a fourth bonding layer that are stacked in sequence. The third bonding layer is provided on the second body portion and is configured to bond the second substrate layer to the housing. The fourth bonding layer is provided on the second body portion and is configured to bond the second substrate layer to the second bend section. The third bonding layer and the fourth bonding layer make it convenient to bond the second bonding piece to the housing and the second bend section, and reduce the wobbling of the electrode assembly in the housing.

In some embodiments, the third bonding layer is further provided on the second extension portion and is configured to bond the second substrate layer to the third bonding piece.

In some embodiments, the fourth bonding layer is further provided on the second extension portion and is configured to bond the second substrate layer to the first section.

In some embodiments, the surface of the second substrate layer oriented toward the electrode assembly is in contact with the first section. That is, the second substrate layer is located in the second body portion and extends from the second body portion to the second extension portion, thereby making it convenient for the second bonding piece and the third bonding piece to bond.

In some embodiments, at least one of the first bonding piece, the second bonding piece, or the third bonding piece is a hot-melt adhesive.

In some embodiments, the third bonding piece includes a fifth bonding layer and a third substrate layer that are stacked together. The fifth bonding layer is configured to bond a surface of the third substrate layer oriented away from the electrode assembly to the housing. A surface of the third substrate layer oriented toward the electrode assembly is bonded to the first extension portion and the second extension portion.

In some embodiments, the third bonding piece includes a fifth bonding layer, a third substrate layer, and a sixth bonding layer that are stacked in sequence. The fifth bonding layer is configured to bond a surface of the third substrate layer oriented away from the electrode assembly to the housing. The sixth bonding layer is configured to bond a surface of the third substrate layer oriented toward the electrode assembly to the first extension portion. The sixth bonding layer is further configured to bond the surface of the third substrate layer oriented toward the electrode assembly to the second extension portion. The fifth bonding layer and the sixth bonding layer enable the third bonding piece to bond to the housing, the first extension portion of the first bonding piece, and the second extension portion of the second bonding piece.

In some embodiments, in a thickness direction of the electrode assembly, a part of the surface of the third substrate layer oriented toward the electrode assembly corresponding to the electrode assembly is defined as a first part, an area of the first part is S1, an area of the sixth bonding layer provided on the first part is S2, $0 \le S2/S1 \le 0.1$. So the third substrate layer is not bonded to the electrode assembly or a part of the third substrate layer is bonded to the electrode assembly. In this way, when the stress on the housing is transmitted to the third bonding piece, the stress can be transmitted quickly to the first bonding layer and the second bonding layer to reduce the risk of damaging the electrode assembly corresponding to the third bonding layer.

In some embodiments, along the winding direction, a width of the first extension portion is 4 mm to 15 mm.

In some embodiments, along the winding direction, a width of the second extension portion is 4 mm to 15 mm.

In some embodiments, the first electrode plate includes a first current collector, and an outer surface of the first section is an outer surface of the first current collector. Generally, the hardness of the first current collector is greater than the hardness of the separator. By disposing the first current collector on the outer surface of the first section, the protection for the electrode assembly is enhanced.

In some embodiments, an outermost layer of the second bend section is the separator, and an ending of the separator is located in the second bend section. When the part corresponding to the first section on the housing is stressed, the stress can be transmitted from the third bonding piece to the first bonding piece and the second bonding piece. In other words, the stress is transmitted to the unstressed or less stressed first bend section and second bend section, thereby enhancing the protection for the electrode assembly corresponding to the first section, and reducing the risk of failure of the electrochemical device that is stressed on the whole.

In some embodiments, the first electrode plate is a positive electrode plate. When the first electrode plate is located at the outermost circle of the winding structure, in contrast to a circumstance in which the first electrode plate is a negative electrode plate, the electrode assembly achieves a higher capacity and a higher energy density.

In some embodiments, the electrochemical device includes a first tab. The first tab is connected to the first electrode plate. In a width direction of the electrode assembly, the first tab is detached from the first extension portion, and the first tab is detached from the second extension portion. In this way, in the thickness direction of the electrode assembly, the thickness of the electrode assembly is prevented from being increased by the bonding between the third bonding piece and the first extension portion or second extension portion.

In some embodiments, the first bonding piece includes a third extension portion in addition to the first body portion and the first extension portion. The third extension portion extends from the first body portion to the surface of the second section along the winding direction. The second bonding piece includes a fourth extension portion in addition to the second body portion and the second extension portion. The fourth extension portion extends from the second body portion to the surface of the second section along a direction opposite to the winding direction. The electrochemical device further includes a fifth bonding piece. The fifth bonding piece is disposed between the electrode assembly and the housing. The fifth bonding piece is bonded to the housing, the third extension portion, and the fourth extension portion. The arrangement of the third extension portion, the fourth extension portion, and the fifth bonding piece enhances the protection for the electrode assembly.

According and an aspect of embodiments of this application, this application provides an electronic device. The electronic device includes a main body and the electrochemical device described above.

In some embodiments, the electronic device further includes a fourth bonding piece. The fourth bonding piece is configured to bond the main body to the housing. In a thickness direction of the electrode assembly, the third bonding piece is located between the first section and the fourth bonding piece. In this way, the electrochemical device is disposed inside the electronic device, thereby reducing the wobbling of the electrochemical device. In addition, when the part corresponding to the first section on the housing of the electrochemical device is subjected to a stress from the electronic device or the like, the stress can be transmitted to the first bonding piece and the second bonding piece through the fourth bonding piece and the third bonding piece. In this way, the stress is dispersed, the risk of failure of the electrochemical device is reduced, and the service life of the electronic device is increased.

The beneficial effects of embodiments of this application include: an electrochemical device is provided, and a first bonding piece, a second bonding piece, and a third bonding piece are disposed between the electrode assembly and the housing of the electrochemical device. The first bonding piece is configured to bond the first bend section of the electrode assembly to the housing. The second bonding piece is configured to bond the second bend section of the electrode assembly to the housing. The third bonding piece is bonded to the first bonding piece and the second bonding piece, and the third bonding piece is bonded to the housing, thereby reducing the wobbling of the electrode assembly in the housing, and improving the anti-drop performance of the electrochemical device. When the housing is stressed, on the one hand, the stress is cushioned by the first bonding piece, the second bonding piece, and the third bonding piece, thereby reducing the risk of tearing and damaging the electrode assembly, and reducing the risk of failure of the electrochemical device. On the other hand, the stress on the housing is transmitted to the first bonding piece and the second bonding piece through the third bonding piece, thereby reducing the risk of tearing the electrode assembly by an excessive stress between the third bonding piece and the housing, and in turn, reducing the risk of failure of the electrochemical device. In addition, an electrolyte solution may reduce the bonding force of the third bonding piece infiltrated by the electrolytic solution, and impact the third bonding piece when the electrode assembly is dropping. The impact may further reduce the bonding force of the third bonding piece. The arrangement of the first bonding piece and the second bonding piece may reduce the risk of wobbling the electrode assembly in the housing caused by the reduced bonding force of the third bonding piece, and improve the safety performance.

BRIEF DESCRIPTION OF THE DRAWINGS

One or more embodiments are described illustratively with reference to drawings corresponding to the embodiments. The illustrative description does not constitute any limitation on the embodiments. Components marked with the same reference numeral in the drawings represent similar components. Unless otherwise specified, the drawings do not constitute any scale limitation.

DETAILED DESCRIPTION

For ease of understanding this application, the following describes this application in more detail with reference to drawings and specific embodiments. It is hereby noted that an element referred to herein as "fixed to" another element may directly exist on the other element, or may be fixed to the other element through one or more intermediate elements. An element referred to herein as "connected to" another element may be connected to the other element directly or through one or more intermediate elements. The terms "vertical", "horizontal", "left", "right", "in", "out" and other similar expressions used herein are merely for ease of description.

Unless otherwise defined, all technical and scientific terms used herein have the same meanings as what is generally understood by a person skilled in the technical field of this application. The terms used in the specification of this application are merely intended to describe specific embodiments but not to limit this application. The term "and/or" used herein is intended to include any and all combinations of one or more related items preceding and following the term.

Embodiment 1

Figure 1:
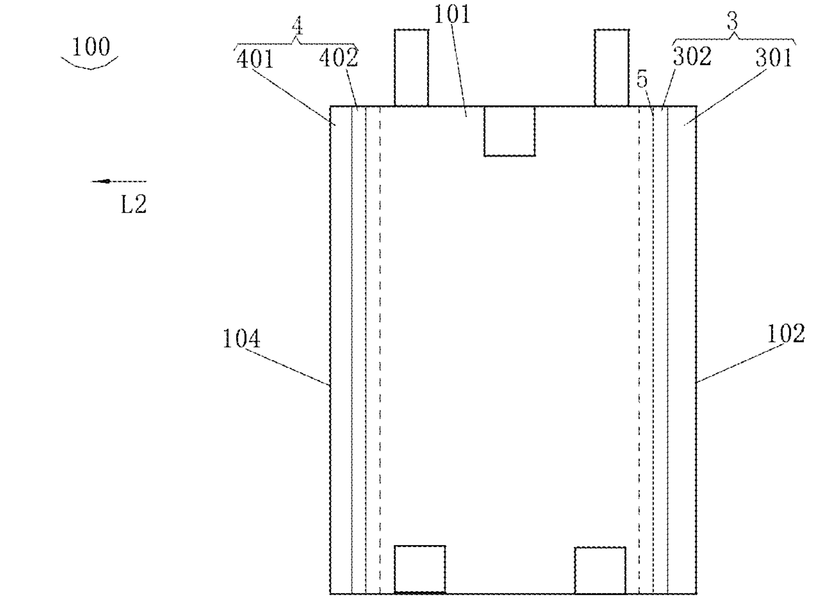
FIG. 1 is a schematic diagram of the interior of an electrochemical device according to each embodiment of this application.
Figure 2:
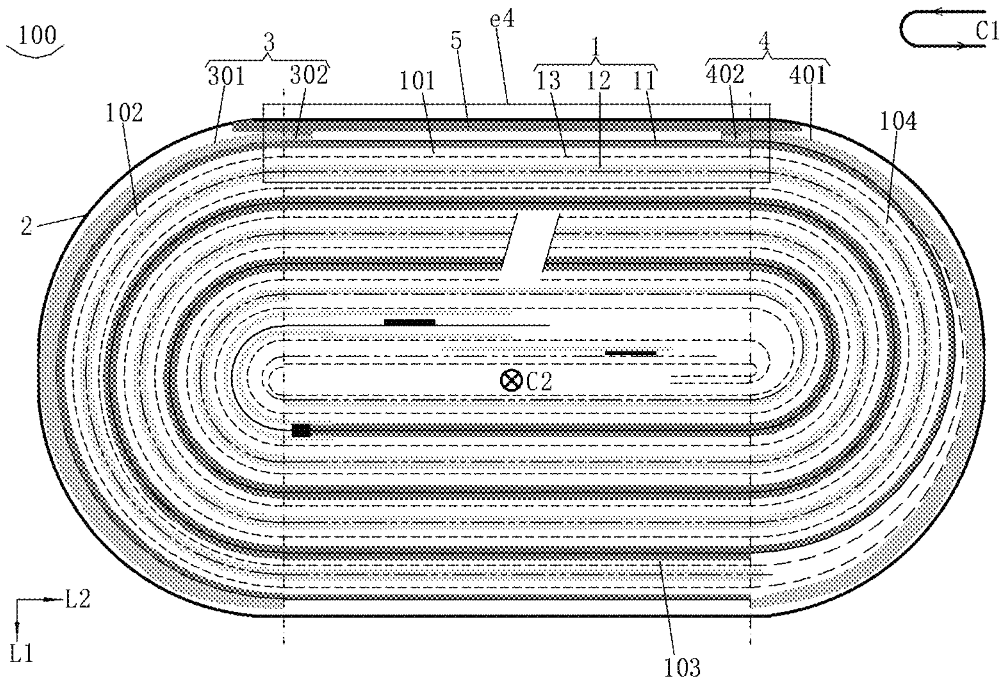
FIG. 2 is a schematic diagram of an electrochemical device according to Embodiment 1 of this application.

FIG. 1 is a schematic diagram of the interior of an electrochemical device 100 according to each embodiment of this application. FIG. 2 is a schematic diagram of an electrochemical device according to Embodiment 1 of this application. The electrochemical device 100 includes: an electrode assembly 1, a housing 2, a first bonding piece 3, a second bonding piece 4, and a third bonding piece 5. The electrode assembly 1 is accommodated in the housing 2. The first bonding piece 3, the second bonding piece 4, and the third bonding piece 5 are all disposed between the electrode assembly 1 and the housing 2.

With respect to the electrode assembly 1, the electrode assembly 1 includes a first electrode plate 11, a second electrode plate 12, and a separator 13 disposed between the first electrode plate 11 and the second electrode plate 12. The first electrode plate 11, the separator 13, and the second electrode plate 12 are wound to form a wound structure. Along a winding direction C1, the electrode assembly 1 includes a first section 101, a first bend section 102, a second section 103, and a second bend section 104 that are connected in sequence. The first electrode plate 11, the separator 13, and the second electrode plate 12 are wound around a winding center axis C2 along the winding direction C1 to form a wound structure.

In some embodiments, the first section 101 and the second section 103 may be flat straight sections that are parallel to each other. In some embodiments, the first section 101 and/or the second section 103 may be bend sections instead, without being particularly limited herein.

The structure and functions of each component in this application are described by using an example in which the direction from the first section 101 to the second section 103 is a thickness direction L1 of the electrode assembly 1. In this application, the direction from the first bend section 102 to the second bend section 104 is defined as a width direction L2 of the electrode assembly 1. In addition, the directions defined in this application are merely for ease of description, without constituting any limitation on this application.

The first electrode plate 11 and the second electrode plate 12 are of opposite polarities. The first electrode plate 11 is a positive electrode plate, and the second electrode plate 12 is a negative electrode plate; or, the first electrode plate 11 is a negative electrode plate, and the second electrode plate 12 is a positive electrode plate.

With respect to the housing 2, the housing 2 is a packaging bag formed by a packaging film configured to package the electrode assembly 1. For example, the packaging film is an aluminum plastic film. In this case, the electrochemical device 100 forms a pouch-type battery. The housing 2 may be a steel shell or an aluminum shell instead. In this case, the electrochemical device 100 forms a hard-case battery, such as a steel-case battery or an aluminum-case battery, without being particularly limited herein.

With respect to the first bonding piece 3, the first bonding piece 3 includes a first body portion 301 and a first extension portion 302. The first body portion 301 is configured to bond the first bend section 102 to the housing 2. The first extension portion 302 extends from the first body portion 301 to the surface of the first section 101 along a direction opposite to the winding direction C1.

With respect to the second bonding piece 4, the second bonding piece 4 includes a second body portion 401 and a second extension portion 402. The second body portion 401 is configured to bond the second bend section 104 to the housing 2. The second extension portion 402 extends from the second body portion 401 to the surface of the first section 101 along the winding direction C1.

With respect to the third bonding piece 5, the third bonding piece 5 is disposed between the electrode assembly 1 and the housing 2. The third bonding piece 5 is bonded to the housing 2, the first extension portion 302, and the second extension portion 402. A part to which the third bonding piece 5 is bonded on the housing 2 is a part corresponding to the first section 101 on the housing 2.

It is hereby noted that the first bonding piece 3, the second bonding piece 4, and the third bonding piece 5 may be discrete structures or an integrated structure. In other words, the first bonding piece 3, the second bonding piece 4, and the third bonding piece 5 may be a one-piece structure.

It is hereby noted that in some embodiments, at least one of the first bonding piece 3, the second bonding piece 4, or the third bonding piece 5 is a hot-melt adhesive. Specifically, the material thereof includes polyamide (PA), polyester (PES), polyethylene (PE), polypropylene (PP), polyesteramide (PEA), polyurethane (PU), styrene and a block copolymer thereof, ethylene-propylene-1-butene polymer (APAO), poly(ethylene-co-vinyl acetate)(EVA), poly(ethylene-co-ethyl acrylate) (EEA), poly(ethylene-co-acrylic acid) (EAA), or the like.

In some embodiments of this application, the housing 2 is bonded to the electrode assembly 1 by the first bonding piece 3 and the second bonding piece 4, thereby reducing the wobbling of the electrode assembly 1 in the housing 2, and improving the anti-drop performance of the electrochemical device 100. The housing 2 is bonded to the third bonding piece 5. The third bonding piece 5 is further bonded to the first extension portion 302 of the first bonding piece 3. The third bonding piece 5 is further bonded to the second extension portion 402 of the second bonding piece 4, thereby reducing the wobbling of the electrode assembly 1 in the housing 2, and improving the anti-drop performance of the electrochemical device 100. When the housing 2 is stressed, on the one hand, the stress is cushioned by the first bonding piece 3, the second bonding piece 4, and the third bonding piece 5, thereby reducing the risk of tearing and damaging the electrode assembly 1, and reducing the risk of failure of the electrochemical device 100. On the other hand, the stress on the housing 2 is transmitted to the first bonding piece 3 and the second bonding piece 4 through the third bonding piece 5, thereby reducing the risk of tearing the electrode assembly 1 by an excessive stress between the third bonding piece 5 and the housing 2, and in turn, reducing the risk of failure of the electrochemical device 100. In addition, an electrolyte solution (not shown) may reduce the bonding force of the third bonding piece 5 infiltrated by the electrolytic solution, and impact the third bonding piece 5 when the electrode assembly is dropping. The impact may further reduce the bonding force of the third bonding piece. The arrangement of the first bonding piece 3 and the second bonding piece 4 may reduce the risk of wobbling the electrode assembly 1 in the housing 2 caused by the reduced bonding force of the third bonding piece 5, and improve the safety performance.

Embodiment 2

Figure 3:
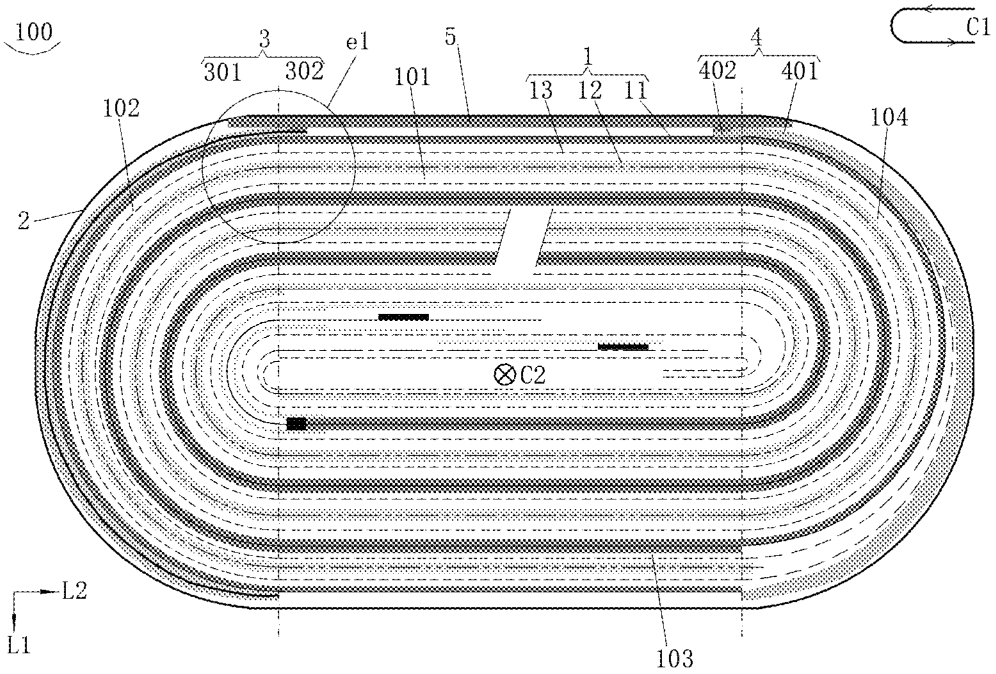
FIG. 3 is a schematic diagram of an electrochemical device according to Embodiment 2 of this application.
Figure 4:
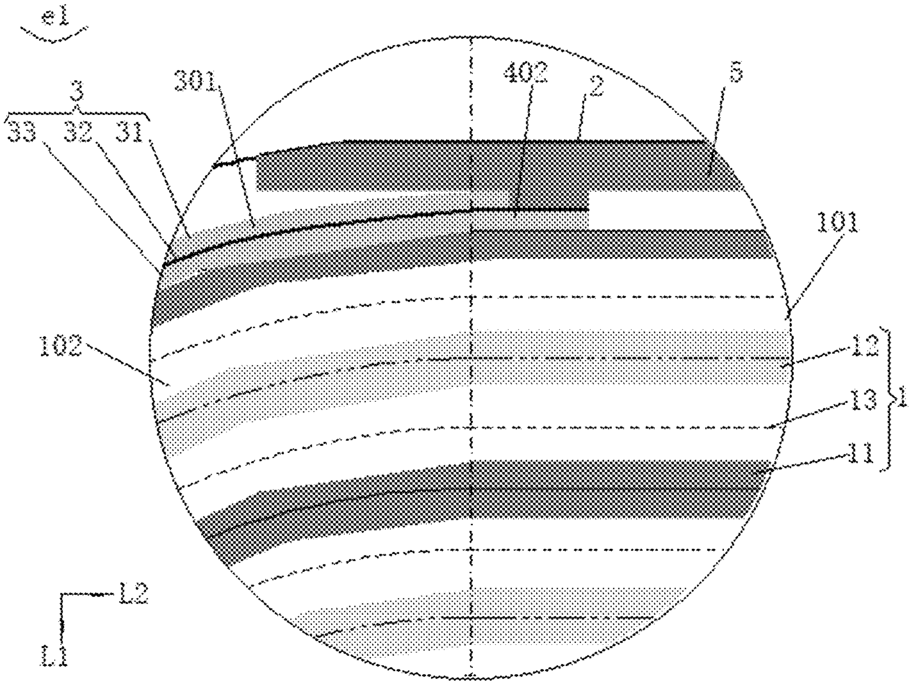
FIG. 4 is a close-up view of a part e1 shown in FIG. 3 according to an embodiment of this application.

FIG. 3 is a schematic diagram of an electrochemical device according to Embodiment 2 of this application, and FIG. 4 is a close-up view of a part e1 shown in FIG. 3 according to an embodiment of this application. This embodiment differs from Embodiment 1 in that the first bonding piece 3 includes a first bonding layer 31, a first substrate layer 32, and a second bonding layer 33 that are stacked in sequence. The first bonding layer 31 is provided on the first body portion 301. The second bonding layer 33 is provided on the first body portion 301. The first bonding layer 31 is configured to bond a surface of the first substrate layer 32 oriented away from the electrode assembly 1 to the housing 2. The second bonding layer 33 is configured to bond a surface of the first substrate layer 32 oriented toward the electrode assembly 1 to the first bend section 102.

In some embodiments, the surface of the first substrate layer 32 oriented toward the electrode assembly 1 is in contact with the first section 101. To be specific, the first substrate layer 32 is located on the first body portion 301, and extends from the first body portion 301 to the first extension portion 302. In some embodiments, the first bonding layer 31 is further provided on the first extension portion 302, and the first bonding layer 31 is configured to bond the surface of the first substrate layer away from the electrode assembly 1 to a surface of the third bonding piece 5 oriented toward the electrode assembly 1. In some embodiments, the second bonding layer 33 is further provided on the first extension portion 302, and the second bonding layer 33 is configured to bond the first substrate layer 32 to the electrode assembly 1.

In some embodiments, the first substrate layer 32 extends from the first body portion 301 to the first extension portion 302, the second bonding layer 33 extends from the first body portion 301 to the first extension portion 302, the second bonding layer 33 is configured to bond the first substrate layer 32 to the first section 101 of the electrode assembly 1, and the first bonding layer 31 is fully located on the first body portion 301. Alternatively, the first bonding layer 31 extends to the first extension portion 302, but a part of the first substrate layer 32, which is located on the first extension portion 302, is exposed to allow for bonding between the third bonding piece 5 and the first extension portion 302 of the first bonding piece 3. In this way, the size of the electrode assembly 1 in the thickness direction L1 of the electrode assembly 1 is prevented from being increased by the bonding between the first bonding piece 3 and the third bonding piece 5.

In some embodiments, along the winding direction C1, the size of the first bonding layer 31 is not less than 10 mm, so as to ensure proper connection between the first bonding piece 3 and the housing 2.

In some embodiments, the material of the first substrate layer 32 includes at least one of polyfluoroolefin, polyethylene terephthalate (PET), polyimide (PI), polyamideimide (PAI), a heat-shrinkable material, polyvinyl chloride (PVC), or a biaxially oriented polyolefin (POF) heat-shrinkable film. The polyfluoroolefin may be, but without being limited to, polytetrafluoroethylene or polyvinylidene difluoride. The first substrate layer 32 may be made of a metal instead, such as aluminum, copper or stainless steel.

In some embodiments, the materials of the first bonding layer 31 and the second bonding layer 33 include at least one of acrylic resin, polyurethane/rubber, or silicone. The acrylic resin may be, but without being limited to, ethyl 2-methylacrylate (EMA). In some embodiments, the first bonding layer 31 may be a hot-melt adhesive, thereby making it convenient to put the electrode assembly 1 into the housing 2. In a hot pressing process, the first bonding layer 31 is bonded to the housing 2.

In some embodiments, along a direction of stacking the first bonding layer 31, the first substrate layer 32, and the second bonding layer 33, the thickness of the first substrate layer 32 is greater than the thickness of the first bonding layer 31, and the thickness of the first substrate layer 32 is greater than the thickness of the second bonding layer 33. The thickness of the first bonding piece 3 ranges from 20 μm to 48 μm. The thickness of the first bonding layer 31 ranges from 4 μm to 15 μm. The thickness of the second bonding layer 33 ranges from 4 μm to 15 μm. The thickness of the first substrate layer 32 ranges from 10 μm to 20 μm.

Embodiment 3

Figure 5:
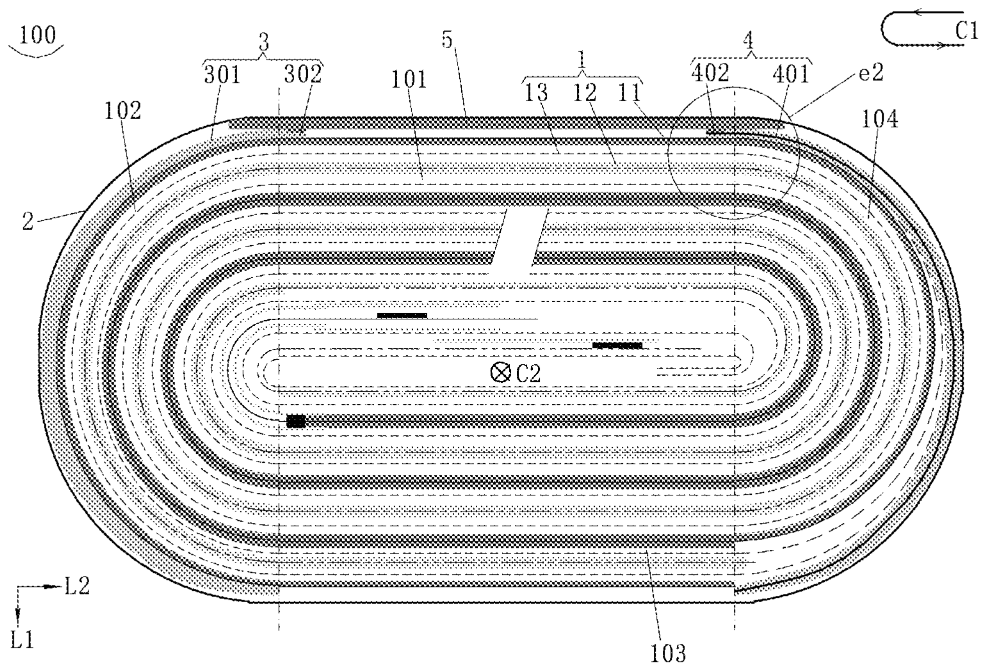
FIG. 5 is a schematic diagram of an electrochemical device according to Embodiment 3 of this application.
Figure 6:
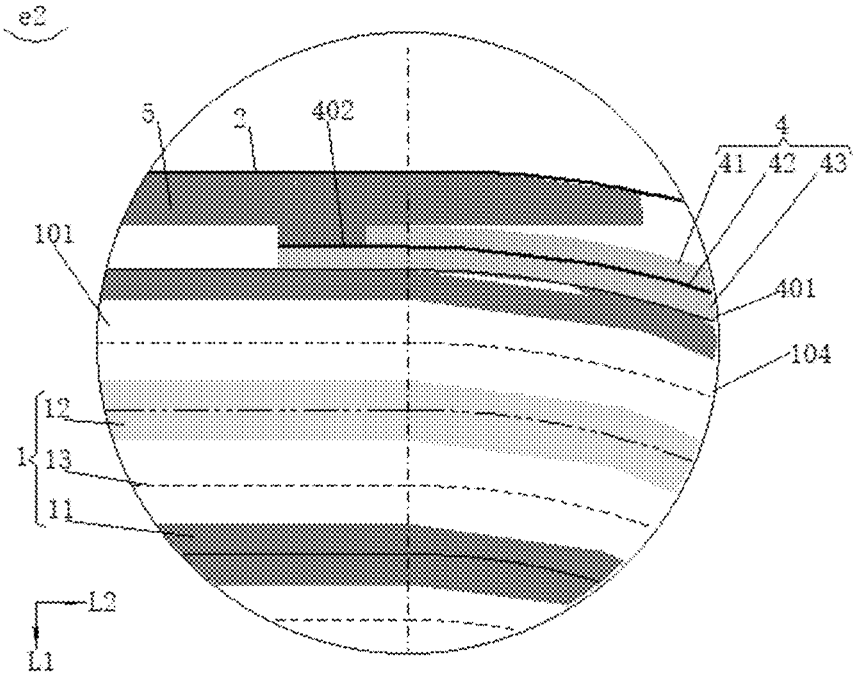
FIG. 6 is a close-up view of a part e2 shown in FIG. 5 according to an embodiment of this application.

FIG. 5 is a schematic diagram of an electrochemical device according to Embodiment 3 of this application. FIG. 6 is a close-up view of a part e2 shown in FIG. 5 according to an embodiment of this application. This embodiment differs from Embodiment 1 in that the second bonding piece 4 includes a third bonding layer 41, a second substrate layer 42, and a fourth bonding layer 43 that are stacked in sequence. The third bonding layer 41 is provided on the second body portion 401. The fourth bonding layer 43 is provided on the second body portion 401. The third bonding layer 41 is configured to bond a surface of the second substrate layer 42 oriented away from the electrode assembly 1 to the housing 2. The fourth bonding layer 43 is configured to bond a surface of the second substrate layer 42 oriented toward the electrode assembly 1 to the first bend section 102.

In some embodiments, the surface of the second substrate layer 42 oriented toward the electrode assembly 1 is in contact with the first section 101. To be specific, the second substrate layer 42 is located on the second body portion 401, and extends from the second body portion 401 to the second extension portion 402. In some embodiments, the third bonding layer 41 is further provided on the second extension portion 402. The third bonding layer 41 is configured to bond the surface of the second substrate layer 42 oriented away from the electrode assembly 1 to the surface of the third bonding piece 5 oriented toward the electrode assembly 1. In some embodiments, the fourth bonding layer 43 is further provided on the second extension portion 402. The fourth bonding layer 43 is configured to bond the second substrate layer 42 to the electrode assembly 1.

Preferably, the second substrate layer 42 extends from the second body portion 401 to the second extension portion 402, the fourth bonding layer 43 extends from the second body portion 401 to the second extension portion 402, the fourth bonding layer 43 is configured to bond the second substrate layer 42 to the first section 101 of the electrode assembly 1, and the third bonding layer 41 is fully located on the second body portion 401. Alternatively, the third bonding layer 41 extends to the second extension portion 402, but a part of the second substrate layer 42, which is located on the second extension portion 402, is exposed to allow for bonding between the third bonding piece 5 and the second extension portion 402 of the second bonding piece 4. In this way, the size of the electrode assembly 1 in the thickness direction L1 of the electrode assembly 1 is prevented from being increased by the bonding between the second bonding piece 4 and the third bonding piece 5.

In some embodiments, along the winding direction C1, the size of the third bonding layer 41 is not less than 10 mm, so as to ensure proper connection between the second bonding piece 4 and the housing 2.

In some embodiments, the material of the second substrate layer 42 includes at least one of polyfluoroolefin, polyethylene terephthalate (PET), polyimide (PI), polyamideimide (PAI), a heat-shrinkable material, polyvinyl chloride (PVC), or a biaxially oriented polyolefin (POF) heat-shrinkable film. The polyfluoroolefin may be, but without being limited to, polytetrafluoroethylene or polyvinylidene difluoride. The second substrate layer 42 may be made of a metal instead, such as aluminum, copper or stainless steel.

In some embodiments, the materials of the third bonding layer 41 and the fourth bonding layer 43 include at least one of acrylic resin, polyurethane/rubber, or silicone. The acrylic resin may be, but without being limited to, ethyl 2-methylacrylate (EMA). In some embodiments, the third bonding layer 41 may be a hot-melt adhesive, thereby making it convenient to put the electrode assembly 1 into the housing 2. In a hot pressing process, the third bonding layer 41 is bonded to the housing 2.

In some embodiments, along a direction of stacking the third bonding layer 41, the second substrate layer 42, and the fourth bonding layer 43, the thickness of the second substrate layer 42 is greater than the thickness of the third bonding layer 41, and the thickness of the second substrate layer 42 is greater than the thickness of the fourth bonding layer 43. The thickness of the first bonding piece 3 ranges from 20 μm to 48 μm. The thickness of the third bonding layer 41 ranges from 4 μm to 15 μm. The thickness of the fourth bonding layer 43 ranges from 4 μm to 15 μm. The thickness of the second substrate layer 42 ranges from 10 μm to 20 μm.

It is hereby noted that Embodiment 3 may be combined with Embodiment 2, and a technical solution thereby formed still falls within the protection scope of this application.

Embodiment 4

Figure 7:
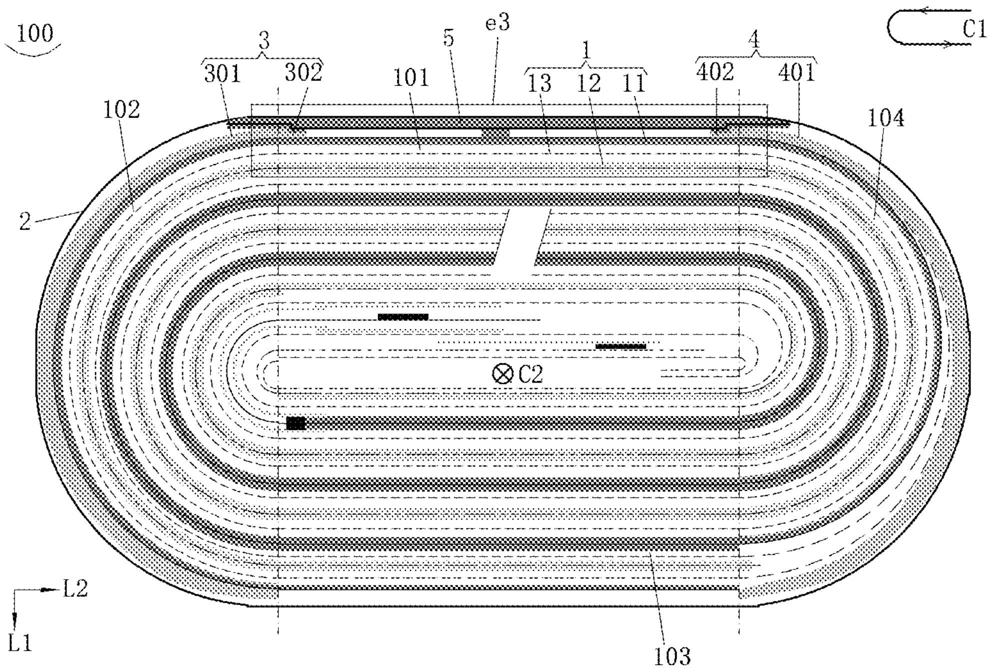
FIG. 7 is a schematic diagram of an electrochemical device according to Embodiment 4 of this application.
Figure 8:
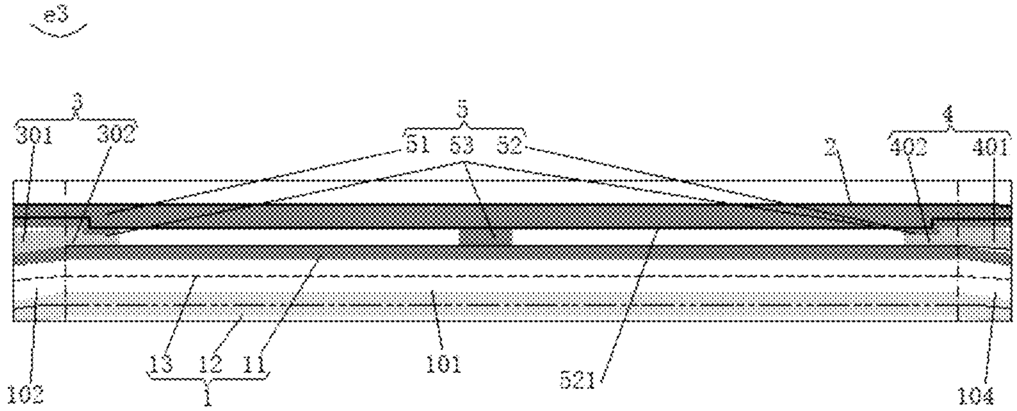
FIG. 8 is a close-up view of a part e3 shown in FIG. 7 according to an embodiment of this application.

FIG. 7 is a schematic diagram of an electrochemical device according to Embodiment 4 of this application. FIG. 8 is a close-up view of a part e3 shown in FIG. 7 according to an embodiment of this application. This embodiment differs from Embodiment 1 in that the third bonding piece 5 includes a fifth bonding layer 51 and a third substrate layer 52 that are stacked together. The fifth bonding layer 51 is configured to bond a surface of the third substrate layer 52 oriented away from the electrode assembly 1 to the housing 2. The surface of the third substrate layer 52 oriented toward the electrode assembly 1 is bonded to the first extension portion 302 of the first bonding piece 3. The surface of the third substrate layer 52 oriented toward the electrode assembly 1 is also bonded to the second extension portion 402.

In some embodiments, the third bonding piece 5 not only includes the fifth bonding layer 51 and the third substrate layer 52, but also includes a sixth bonding layer 53. The sixth bonding layer 53 is configured to bond the surface of the third substrate layer 52 oriented toward the electrode assembly 1 to the first extension portion 302 of the first bonding piece 3. The sixth bonding layer 53 is further configured to bond the surface of the third substrate layer 52 oriented toward the electrode assembly 1 to the second extension portion 402 of the second bonding piece 4.

In some embodiments, in the thickness direction L1 of the electrode assembly 1, a part of the surface of the third substrate layer 52 oriented toward the electrode assembly 1 corresponding to the electrode assembly 1 is defined as a first part 521. The area of the first part 521 is S1. The area of the sixth bonding layer 53 provided on the first part 521 is S2. The areas satisfy $0 \le S2/S1 \le 0.1$. Therefore, the third substrate layer 52 is not bonded to the electrode assembly 1 or a small part of the third substrate layer 52 is bonded to the electrode assembly 1. In this way, when the stress on the housing 2 is transmitted to the third bonding piece 5, the stress may be transmitted quickly to the first bonding layer 31 and the second bonding layer 33 to reduce the risk of damaging the electrode assembly 1 corresponding to the third bonding layer 41.

It is hereby noted that Embodiment 4 may be combined with Embodiment 2 and/or Embodiment 3, and a technical solution thereby formed still falls within the protection scope of this application.

Embodiment 5

Figure 9:
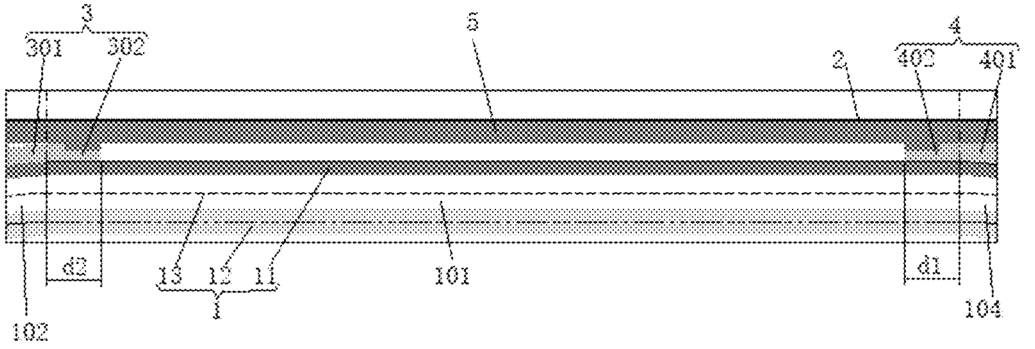
FIG. 9 is a close-up view of a part e4 shown in FIG. 2 according to an embodiment of this application.

FIG. 9 is a close-up view of a part e4 shown in FIG. 2 according to an embodiment of this application. This embodiment further defines the width of the first extension portion 302 in Embodiment 1. Along the width direction L2 of the electrode assembly 1, the width d1 of the first extension portion 302 is 4 mm to 15 mm.

This embodiment further defines the width of the second extension portion 402 in Embodiment 1. Along the width direction L2 of the electrode assembly 1, the width d2 of the second extension portion 402 is 4 mm to 15 mm.

It is hereby noted that Embodiment 5 may be combined with one or more of Embodiment 2, Embodiment 3, and Embodiment 4, and a technical solution thereby formed still falls within the protection scope of this application.

Embodiment 6

Figure 10:
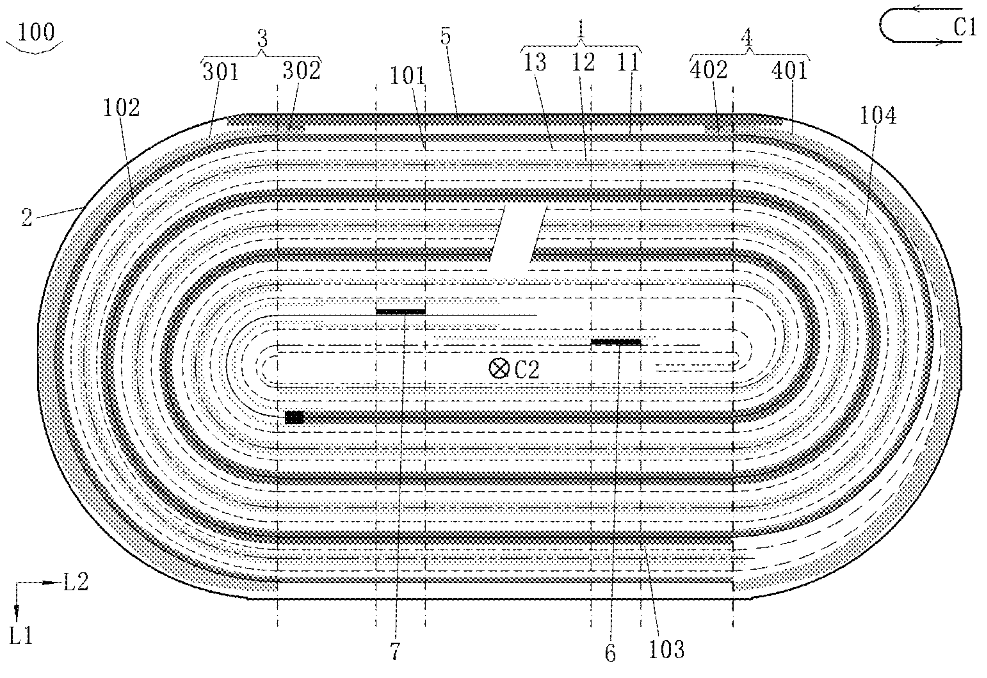
FIG. 10 is a schematic diagram of an electrochemical device according to Embodiment 6 of this application.

FIG. 10 is a schematic diagram of an electrochemical device according to Embodiment 6 of this application. This embodiment differs from Embodiment 1 in that the electrochemical device 100 includes a first tab 6. The first tab 6 is connected to the first electrode plate 11. In the width direction L2 of the electrode assembly 1, the first tab 6 is distant from the first extension portion 302, and the first tab 6 is distant from the second extension portion 402. In this way, in the thickness direction L1 of the electrode assembly 1, the thickness of the electrode assembly 1 may be prevented from being increased by the bonding between the third bonding piece 5 and the first extension portion 302 or second extension portion 402.

In some embodiments, the electrochemical device 100 includes a second tab 7. The second tab 7 is connected to the second electrode plate 12. In the width direction L2 of the electrode assembly 1, the second tab 7 is distant from the first extension portion 302, and the second tab 7 is distant from the second extension portion 402. In this way, in the thickness direction L1 of the electrode assembly 1, the thickness of the electrode assembly 1 may be prevented from being increased by the bonding between the third bonding piece 5 and the first extension portion 302 or second extension portion 402.

It is hereby noted that Embodiment 6 may be combined with one or more of Embodiment 2, Embodiment 3, Embodiment 4, or Embodiment 5, and a technical solution thereby formed still falls within the protection scope of this application.

Embodiment 7

Figure 11:
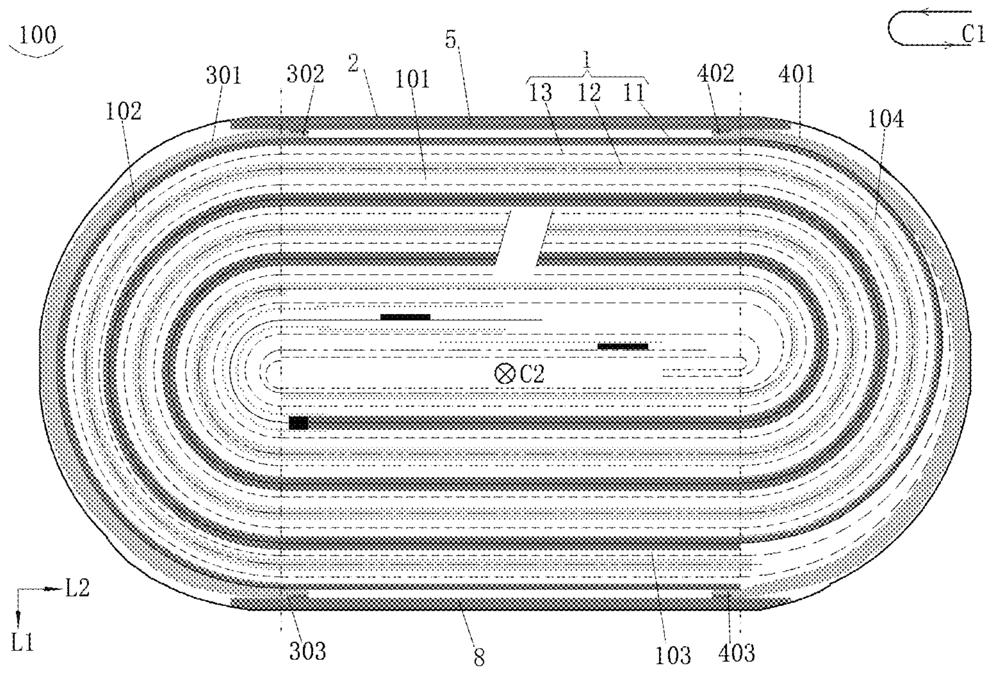
FIG. 11 is a schematic diagram of an electrochemical device according to Embodiment 7 of this application.

FIG. 11 is a schematic diagram of an electrochemical device according to Embodiment 7 of this application. This embodiment differs from Embodiment 1 in that the first bonding piece 3 includes a third extension portion 303 in addition to the first body portion 301 and the first extension portion 302, and the third extension portion 303 extends from the first body portion 301 to the surface of the second section 103 along the winding direction C1. The second bonding piece 4 includes a fourth extension portion 403 in addition to the second body portion 401 and the second extension portion 402. The fourth extension portion 403 extends from the second body portion 401 to the surface of the second section 103 along a direction opposite to the winding direction C1. The electrochemical device 100 further includes a fifth bonding piece 8. The fifth bonding piece 8 is disposed between the electrode assembly 1 and the housing 2. The fifth bonding piece 8 is bonded to the housing 2, the third extension portion 303, and the fourth extension portion 403. A part to which the fifth bonding piece 8 is bonded on the housing 2 is a part corresponding to the second section 103 on the housing 2. The arrangement of the third extension portion 303, the fourth extension portion 403, and the fifth bonding piece 8 reduces the wobbling of the electrode assembly 1 in the housing 2, and improves the anti-drop performance of the electrochemical device 100.

It is hereby noted that the structure and functions of the first bonding piece 3 located on the third extension portion 303 may be learned by referring to Embodiment 2 above, details of which are omitted here.

It is hereby noted that the structure and functions of the second bonding piece 4 located on the fourth extension portion 403 may be learned by referring to Embodiment 3 above, details of which are omitted here.

It is hereby noted that the structure and functions of the fifth bonding piece 8 may be learned by referring to the description of the third bonding piece 5 in Embodiment 4, details of which are omitted here.

It is hereby noted that the technical solutions of Embodiment 5 and Embodiment 6 may be combined with this embodiment, and a technical solution thereby formed still falls within the protection scope of this application.

Embodiment 8

Figure 12:
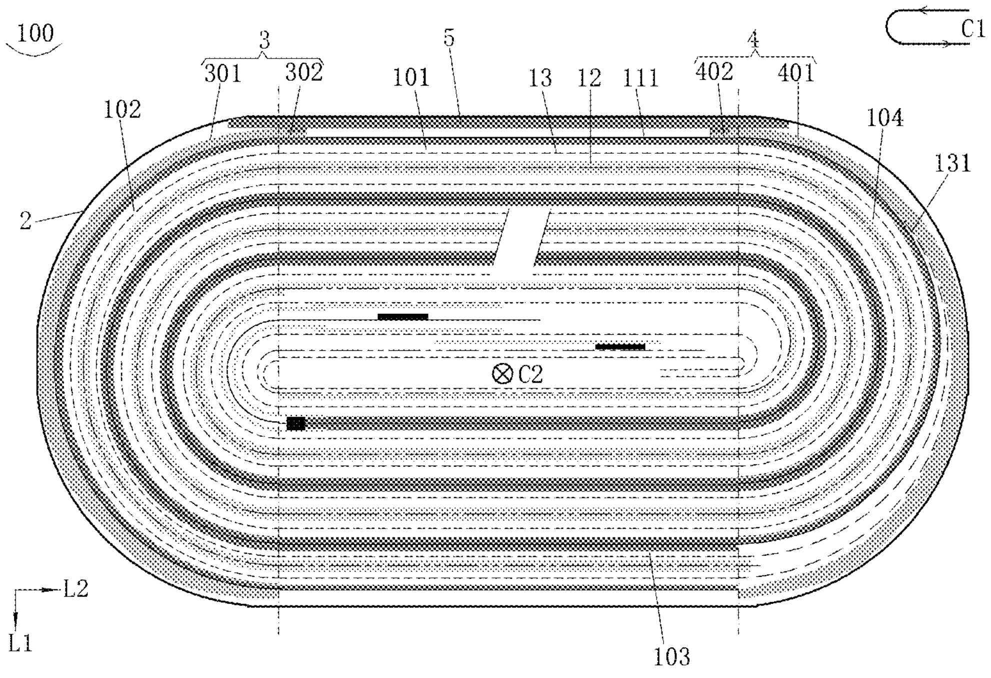
FIG. 12 is a schematic diagram of an electrochemical device according to Embodiment 8 of this application.

FIG. 12 is a schematic diagram of an electrochemical device according to Embodiment 8 of this application. This embodiment further defines the wound structure in Embodiment 1. The first electrode plate 11 includes a first current collector 111, and an outer surface of the first section 101 is an outer surface of the first current collector 111. The outer surface of the first section 101 is a surface of a part farthest from the winding center axis C2 on the first section 101, where the surface is oriented away from the winding center axis C2. In other words, the outer surface of the first section 101 is the first current collector 111 in the first electrode plate 11 rather than the separator 13. When the first electrode plate 11 is a positive electrode plate, such an arrangement increases the capacity of the electrode assembly 1. In addition, the first current collector 111 increases the hardness of the electrode assembly 1, thereby enhancing the protection for the electrode assembly 1.

In some embodiments, not only the outer surface of the first section 101 is the outer surface of the first current collector 111, but also the outermost layer of the second bend section 104 is the separator 13. An ending 131 of the separator 13 is located on the second bend section 104. Because the second bonding piece 4 is bonded to the second bend section 104, the second bonding piece 4 may serve as a finishing adhesive to bond the ending 131 of the separator 13 to the second bend section 104.

Generally, when the electrochemical device 100 is applied to an electronic device, a part corresponding to the first section 101 or second section 103 on the housing 2 is bonded to the interior of the electronic device. Therefore, when the electronic device is subjected to mechanical abuse such as drop, collision, and vibration, the part corresponding to the first section 101 or second section 103 on the housing 2 is pulled by the electronic device. In other words, the part corresponding to the first section 101 or second section 103 on the housing 2 is stressed. In this case, according to the arrangement of the components in Embodiment 8, the outer surface of the first section 101 is the outer surface of the first current collector 111, the ending 131 of the separator 13 is disposed on the second bend section 104, and the first bonding piece 3, the second bonding piece 4, and the third bonding piece 5 are disposed. In this way, the stress is transmitted from the third bonding piece 5 to the first bonding piece 3 and the second bonding piece 4. In other words, the stress is transferred to the unstressed or less stressed first bend section 102 and second bend section 104, thereby improving the protection for the first section 101 and second section 103 of the electrode assembly 1 and reducing the risk of failure of the electrochemical device 100 stressed on the whole.

It is hereby noted that Embodiment 8 may be combined with one or more of Embodiment 2, Embodiment 3, Embodiment 4, or Embodiment 5, Embodiment 6, or Embodiment 7, and a technical solution thereby formed still falls within the protection scope of this application.

To facilitate the understanding of this application, 2 types of specific electrochemical devices according to this application are given below as experimental examples, that is, Experimental Example 1 and Experimental Example 2.

Experimental Example 1 and Experimental Example 2 have the same structure, and employ the electrochemical device in Embodiment 5. The width of the first extension portion is 5 mm, and the width of the second extension portion is 5 mm.

Experimental Example 1 differs from Experimental Example 2 in the size. Specifically, along the length direction of the electrode assembly, the length of the electrochemical device in Experimental Example 1 is 90 mm. Along the width direction of the electrode assembly, the width of the electrochemical device in Experimental Example 1 is 66 mm. Along the thickness direction of the electrode assembly, the thickness of the electrochemical device in Experimental Example is 6 mm. The length direction of the electrode assembly is perpendicular to the width direction of the electrode assembly and the thickness direction of the electrode assembly. Along the length direction of the electrode assembly, the length of the electrochemical device in Experimental Example 2 is 87 mm. Along the width direction of the electrode assembly, the width of the electrochemical device in Experimental Example 2 is 64 mm. Along the thickness direction of the electrode assembly, the thickness of the electrochemical device in Experimental Example 2 is 4.8 mm.

Two types of electrochemical devices in the prior art are used as comparative embodiments: Comparative Example 1 and Comparative Example 2. Comparative Example 1 and Comparative Example 2 have the same structure that includes an electrode assembly and a housing. The electrode assembly is accommodated in the housing. A bonding piece is disposed between the electrode assembly and the housing. The bonding piece corresponds to the first section of the electrode assembly. In other words, compared with Experimental Example 1 and Experimental Example 2, Comparative Example 1 and Comparative Example 2 include neither the first bonding piece nor the second bonding piece.

Comparative Example 1 is given in contrast to Experimental Example 1, and the size of the electrochemical device in Comparative Example 1 is the same as that in Experimental Example 1.

Comparative Embodiment 2 is given in contrast to Experimental Example 2, and the size of the electrochemical device in Comparative Embodiment 2 is the same as that in Experimental Example 2.

Performance tests are performed on the Experimental Examples and Comparative Examples, and the test results of the Experimental Example and Comparative Examples are shown in Table 1 below.

The performance test includes a drop test. Table 1 records the number of electrochemical devices with the first electrode plate being torn, the number of the electrochemical devices with a ruptured housing, and the number of short-circuited and failed electrochemical devices among 10 electrochemical devices subjected to a drop test.

The process of the drop test is: Dropping an electrochemical device freely to the surface of a steel plate from a height of 1.8 meters for 6 times in 1 round until 3 rounds are completed. In each round, letting two surfaces of the electrochemical device along the thickness direction of the electrode assembly fall downward to the steel plate respectively, and letting 4 corners of the electrochemical device fall downward to the steel plate respectively.

TABLE 1

| | Number with torn first electrode plate | Number with ruptured housing | Number of short-circuited and failed electrochemical devices |
|---|---|---|---|
| Comparative Example 1 | 8 | 5 | 7 |
| Experimental Example 1 | 0 | 0 | 2 |
| Comparative Example 2 | 6 | 4 | 6 |
| Experimental Example 2 | 0 | 0 | 0 |

As can be seen from Table 1, regardless of the size of the electrochemical device, the anti-drop performance of the electrochemical device of the Experimental Example is higher than that of the Comparative Examples, indicating that the anti-drop performance of the electrochemical device according the Experimental Example of this application is improved significantly. In other words, the electrochemical devices according to the Experimental Example of this application may reduce the failure caused by reasons such as an external force.

Embodiment 9

Figure 13:
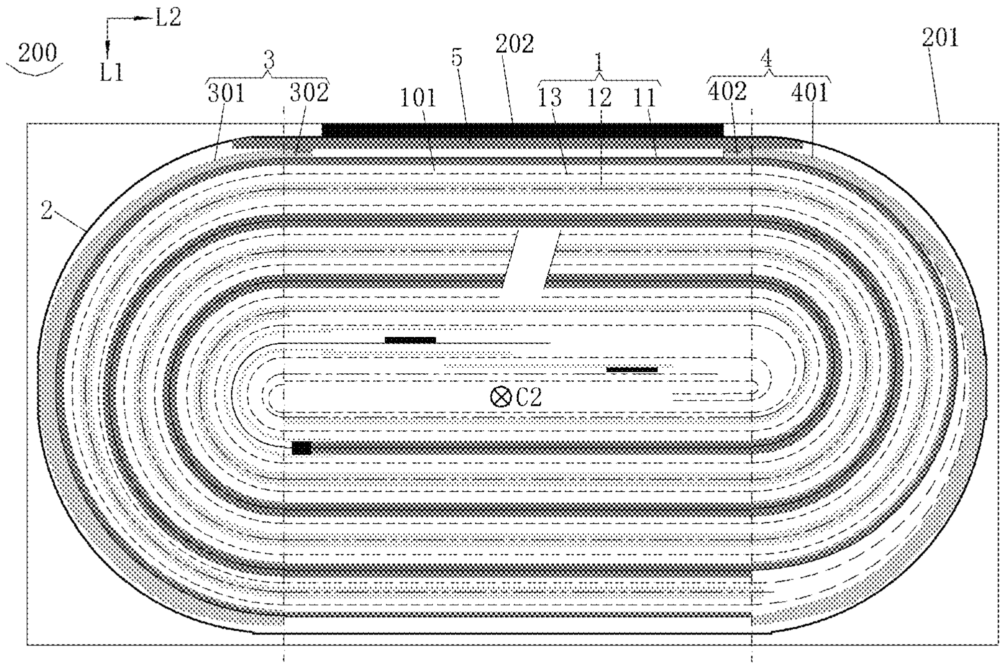
FIG. 13 is a schematic diagram of an electronic device according to an embodiment of this application.

FIG. 13 is a schematic diagram of an electronic device according to an embodiment of this application. The electronic device 200 includes a main body 201 and the electrochemical device 100 according to any one of Embodiments 1 to 8 described above. The specific structure and functions of the electrochemical device 100 may be learned by referring to the foregoing embodiments, details of which are omitted here.

In some embodiments, the electronic device 200 further includes a fourth bonding piece 202. The fourth bonding piece 202 is configured to bond the main body 201 to the housing 2. In a thickness direction L1 of the electrode assembly 1, the third bonding piece 5 is located between the first section 101 and the fourth bonding piece 202. In this way, the electrochemical device 100 is disposed inside the electronic device, thereby reducing the wobbling of the electrochemical device 100. In addition, when the part corresponding to the first section 101 on the housing 2 of the electrochemical device 100 is subjected to a stress from the electronic device 200 or the like, the stress can be transmitted to the first bonding piece 3 and the second bonding piece 4 through the fourth bonding piece 202 and the third bonding piece 5. In this way, the stress is dispersed, the failure of the electrochemical device 100 is reduced, and the service life of the electronic device 200 is increased.

It is hereby noted that although preferred embodiments of this application have been given in the specification and drawings of this application, this application may be implemented in many different forms, without being limited to the embodiments described herein. The embodiments are not intended to limit the content of this application, but merely to facilitate thorough and comprehensive understanding of the content disclosed herein. In addition, all kinds of embodiments that are not enumerated above but are derived by further combination of the foregoing technical features still fall within the scope covered by this application. Further, all improvements and variations, which may be made by a person of ordinary skill in the art based on the foregoing description, still fall within the protection scope of the claims appended hereto.

What is claimed is:

1. An electrochemical device comprising:

an electrode assembly comprising a first electrode plate, a second electrode plate, and a separator disposed between the first electrode plate and the second electrode plate; wherein the first electrode plate, the separator, and the second electrode plate are wound to form a wound structure, and along a winding direction, the electrode assembly comprises a first section, a first bend section, a second section, and a second bend section connected in sequence;

a housing configured to accommodate the electrode assembly;

a first bonding piece comprising a first body portion disposed on a surface of the first bend section and a first extension portion disposed on a surface of the first section; wherein the first body portion bonds the first bend section to the housing;

a second bonding piece comprising a second body portion disposed on a surface of the second bend section and a second extension portion disposed on the surface of the first section; wherein the second body portion bonds the second bend section to the housing; and a third bonding piece disposed between the electrode assembly and the housing; wherein the third bonding piece is bonded to the housing and to the first extension portion and the second extension portion;

wherein the first bonding piece comprises a first bonding layer, a first substrate layer, and a second bonding layer stacked in sequence in a thickness direction of the electrode assembly;

wherein the first bonding layer comprises a layer of the first body portion and bonds a surface of the first substrate layer at the first body portion, oriented away from the electrode assembly, to the housing;

wherein the first substrate layer extends from the first body portion to the first extension portion;

wherein a part of a surface of the first substrate layer at the first extension portion, oriented away from the electrode assembly, is exposed and directly bonded to the third bonding piece in the thickness direction of the electrode assembly.

2. The electrochemical device according to claim 1, wherein the second bonding layer comprises a layer of the first body portion and bonds a surface of the first substrate layer at the first body portion, oriented toward the electrode assembly, to the first bend section.

3. The electrochemical device according to claim 2, wherein the first bonding layer further comprises a layer of the first extension portion and bonds another part of the surface of the first substrate layer at the first extension portion, oriented away from the electrode assembly, to a surface of the third bonding piece, oriented toward the electrode assembly.

4. The electrochemical device according to claim 2, wherein the second bonding layer further comprises a layer of the first extension portion and bonds a surface of the first substrate layer at the first body portion, oriented toward the electrode assembly, to the first section.

5. The electrochemical device according to claim 2, wherein a surface of the first substrate layer at the first extension part, oriented toward the electrode assembly, is in contact with the first section.

6. The electrochemical device according to claim 2, wherein the second bonding piece comprises a third bonding layer, a second substrate layer, and a fourth bonding layer stacked in sequence;

wherein the third bonding layer comprises a layer of the second body portion and bonds the second substrate layer to the housing, and the fourth bonding layer comprises a layer of the second body portion and bonds the second substrate layer to the second bend section.

7. The electrochemical device according to claim 6, wherein the third bonding layer further comprises a layer of the second extension portion and bonds the second substrate layer to the third bonding piece.

8. The electrochemical device according to claim 6, wherein the fourth bonding layer further comprises a layer of the second extension portion and bonds the second substrate layer to the first section.

9. The electrochemical device according to claim 6, wherein a surface of the second substrate layer, oriented toward the electrode assembly, is in contact with the first section.

10. The electrochemical device according to claim 1, wherein at least one of the first bonding piece, the second bonding piece, or the third bonding piece is a hot-melt adhesive.

11. The electrochemical device according to claim 1, wherein the third bonding piece comprises a fifth bonding layer and a third substrate layer stacked together;

wherein the fifth bonding layer bonds a surface of the third substrate layer, oriented away from the electrode assembly, to the housing, and a surface of the third substrate layer, oriented toward the electrode assembly, is bonded to the first extension portion and the second extension portion.

12. The electrochemical device according to claim 1, wherein the third bonding piece comprises a fifth bonding layer, a third substrate layer, and a sixth bonding layer stacked in sequence;

wherein the fifth bonding layer bonds a surface of the third substrate layer, oriented away from the electrode assembly, to the housing, the sixth bonding layer bonds a surface of the third substrate layer, oriented toward the electrode assembly, to the first extension portion, and the sixth bonding layer bonds the surface of the third substrate layer, oriented toward the electrode assembly, to the second extension portion.

13. The electrochemical device according to claim 12, wherein, in the thickness direction of the electrode assembly, a part of the surface of the third substrate layer, oriented toward the electrode assembly and corresponding to the electrode assembly, is defined as a first part, an area of the first part is S1, an area of the sixth bonding layer disposed on the first part is S2, and $0 \le S2/S1 \le 0.1$.

14. The electrochemical device according to claim 1, wherein along the winding direction, a width of the first extension portion is 4 mm to 15 mm.

15. The electrochemical device according to claim 1, wherein the first electrode plate comprises a first current collector, and an outer surface of the first section is an outer surface of the first current collector.

16. The electrochemical device according to claim 15, wherein an outermost layer of the second bend section is the separator, and an ending of the separator is located in the second bend section.

17. The electrochemical device according to claim 15, wherein the first electrode plate is a positive electrode plate.

18. The electrochemical device according to claim 1, further comprising a first tab connected to the first electrode plate; wherein in the thickness direction of the electrode assembly, the first tab does not overlap with the first extension portion, and the first tab does not overlap with the second extension portion.

19. An electronic device comprising an electrochemical device; wherein the electrochemical device comprises:

an electrode assembly comprising a first electrode plate, a second electrode plate, and a separator disposed between the first electrode plate and the second electrode plate; wherein the first electrode plate, the separator, and the second electrode plate are wound to form a wound structure, and along a winding direction, the electrode assembly comprises a first section, a first bend section, a second section, and a second bend section connected in sequence;

a housing configured to accommodate the electrode assembly;

a first bonding piece comprising a first body portion disposed on a surface of the first bend section and a first extension portion disposed on a surface of the first section, wherein the first body portion bonds the first bend section to the housing;

a second bonding piece comprising a second body portion disposed on a surface of the second bend section and a second extension portion disposed on the surface of the first section, wherein the second body portion bonds the second bend section to the housing; and a third bonding piece disposed between the electrode assembly and the housing, wherein the third bonding piece is bonded to the housing and to the first extension portion and the second extension portion;

wherein the first bonding piece comprises a first bonding layer, a first substrate layer, and a second bonding layer stacked in sequence in a thickness direction of the electrode assembly;

wherein the first bonding layer comprises a layer of the first body portion and bonds a surface of the first substrate layer at the first body portion, oriented away from the electrode assembly, to the housing;

wherein the first substrate layer extends from the first body portion to the first extension portion;

wherein a part of a surface of the first substrate layer at the first extension portion, oriented away from the electrode assembly, is exposed and directly bonded to the third bonding piece in the thickness direction of the electrode assembly.

20. The electronic device according to claim 19 further comprising a main body and a fourth bonding piece;

wherein the fourth bonding piece bonds the main body to the housing, and in the thickness direction of the electrode assembly, the third bonding piece is located between the first section and the fourth bonding piece.

* * * * *